US012501202B2

(12) United States Patent
Kim et al.

(10) Patent No.: US 12,501,202 B2
(45) Date of Patent: Dec. 16, 2025

(54) MICROPHONE MODULE AND ELECTRONIC DEVICE COMPRISING MICROPHONE MODULE

(71) Applicant: Samsung Electronics Co., Ltd., Gyeonggi-do (KR)

(72) Inventors: Hongki Kim, Gyeonggi-do (KR); Hyunmin Oh, Gyeonggi-do (KR); Jungsoo Kim, Gyeonggi-do (KR); Chijeong Choi, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 18/133,695

(22) Filed: Apr. 12, 2023

(65) Prior Publication Data

US 2023/0254628 A1 Aug. 10, 2023

Related U.S. Application Data

(63) Continuation of application No. PCT/KR2021/016957, filed on Nov. 18, 2021.

(30) Foreign Application Priority Data

Jan. 12, 2021 (KR) ........................ 10-2021-0003807

(51) Int. Cl.
*H04R 1/10* (2006.01)
*H04R 1/04* (2006.01)

(52) U.S. Cl.
CPC ............. *H04R 1/1075* (2013.01); *H04R 1/04* (2013.01); *H04R 1/1016* (2013.01); *H04R 1/1041* (2013.01)

(58) Field of Classification Search
CPC ...... H04R 1/1075; H04R 1/04; H04R 1/1016; H04R 1/1041; H04R 1/1058; H04R 1/086;
(Continued)

(56) References Cited

U.S. PATENT DOCUMENTS 6,567,525 B1 * 5/2003 Sapiejewski ......... H04R 1/1083 381/372
9,661,410 B1 5/2017 Iwai et al.
(Continued)

FOREIGN PATENT DOCUMENTS

CN 107623881 A 1/2018
JP 3746810 B2 2/2006
(Continued)

OTHER PUBLICATIONS

International Search Report dated Jan. 12, 2021.
Korean Office Action dated Jan. 31, 2025.

*Primary Examiner* — Oyesola C Ojo
(74) *Attorney, Agent, or Firm* — Cha & Reiter, LLC

(57) ABSTRACT

An electronic device and microphone module are disclosed. The electronic device includes a housing forming at least part of an exterior of the electronic device, a nozzle part protruding in one direction from a portion of the housing, at least one sound hole formed at one end of the nozzle part, a sound tube formed within the nozzle part, a microphone module disposed within the sound tube, and including a microphone hole formed on one side thereof, a speaker module disposed under the microphone module, wherein at least some of the microphone inclines in a specific direction within the sound tube, and is coupled to an interior of the nozzle part. The microphone module includes a microphone, a circuit board, a first and second plate, and a waterproofing member.

13 Claims, 8 Drawing Sheets

(58) Field of Classification Search
CPC .............. H04R 2460/01; H04R 1/2884; H04R 2460/09; H04R 2460/15
See application file for complete search history.

(56) References Cited

U.S. PATENT DOCUMENTS

| | | | | |
|---|---|---|---|---|
| 9,792,893 | B1 * | 10/2017 | Gauger, Jr | H04R 1/1083 |
| 10,021,478 | B2 * | 7/2018 | Wurtz | G10K 11/17885 |
| 10,820,088 | B2 * | 10/2020 | Zalisk | H04R 1/1016 |
| 2001/0007050 | A1 * | 7/2001 | Adelman | H04R 25/502 381/328 |
| 2008/0181440 | A1 * | 7/2008 | Saltykov | H04R 1/345 381/328 |
| 2013/0315412 | A1 * | 11/2013 | Annunziato | G10K 11/17817 381/71.6 |
| 2015/0071472 | A1 | 3/2015 | Lee et al. | |
| 2017/0048608 | A1 * | 2/2017 | Yang | H04R 1/1016 |
| 2017/0318401 | A1 * | 11/2017 | Chang | H04R 1/1075 |
| 2019/0069056 | A1 | 2/2019 | Yoon et al. | |
| 2019/0158944 | A1 * | 5/2019 | Belonozhko | H04R 3/14 |
| 2019/0170716 | A1 | 6/2019 | Sim et al. | |
| 2020/0120411 | A1 * | 4/2020 | Yu | H04R 1/08 |
| 2021/0329361 | A1 * | 10/2021 | Kim | H04R 1/1016 |
| 2022/0007097 | A1 * | 1/2022 | Ko | H04R 1/086 |
| 2023/0300514 | A1 * | 9/2023 | Van Noort | H04R 1/342 381/380 |

FOREIGN PATENT DOCUMENTS

| | | | | |
|---|---|---|---|---|
| JP | 2017-117895 | A | 6/2017 | |
| JP | 6664120 | B2 | 3/2020 | |
| KR | 10-2013-0129104 | A | 11/2013 | |
| KR | 10-2017-0030366 | A | 3/2017 | |
| KR | 10-2017-0123818 | A | 11/2017 | |
| KR | 10-2018-0064096 | A | 6/2018 | |
| KR | 10-2019-0021056 | A | 3/2019 | |
| KR | 10-2019-0066474 | A | 6/2019 | |
| KR | 102002529 | B1 | 10/2019 | |
| KR | 10-2059001 | B1 | 12/2019 | |
| KR | 10-2020-0056328 | A | 5/2020 | |
| WO | WO-2017043688 | A1 * | 3/2017 | H04R 1/10 |

* cited by examiner

MICROPHONE MODULE AND ELECTRONIC DEVICE COMPRISING MICROPHONE MODULE

CROSS REFERENCE TO RELATED APPLICATION(S)

The present application is a continuation of International Application No. PCT/KR2021/016957, filed on Nov. 18, 2021, and claims priority to Korean Patent Application No. 10-2021-0003807, filed on Jan. 12, 2021, in the Korean Intellectual Property Office, the disclosure of which are incorporated by reference herein their entirety.

TECHNICAL FIELD

Certain embodiments of the disclosure relate to a microphone module and an electronic device including the microphone module.

BACKGROUND

Along with advancement of digital technology, electronic devices have developed into a diversity of form factors, such as bar devices, foldable devices, rollable devices sliding type devices, tablet personal computer (PC) devices, or personal digital assistants (PDAs).

Electronic devices have further evolved into wearable type devices that can be worn on a user's person, to improve portability and accessibility.

For example, such electronic devices may include an in-ear wearable electronic device that can be worn on the ear.

SUMMARY

An in-ear wearable electronic device (e.g., earphone or earbud) may be worn on the user's ear (e.g., external auditory meatus) for use.

The wearable electronic device may use a microphone module to receive a voice and/or a sound from the external environment, and user a speaker module to output a sound to the external environment.

For example, the wearable electronic device may process a voice and/or sound input through the microphone into an electrical signal, and convert the electrical signal into a sound through the speaker module to output the sound.

When a foreign substance such as moisture enters the microphone of the wearable electronic device, the microphone may fail to operate normally.

When the wearable electronic device includes a waterproof structure that seals the entire internal space or the inlet of the nozzle part, the volume and/or quality of the sound output through the speaker module may be degraded.

Certain embodiments of the disclosure may provide a microphone module including a waterproof member, and an electronic device in which the microphone module is coupled to the inside of the housing on the sound tube, such that degradation of volume and quality of sound output through the speaker module is better maintained.

The technical objectives to be achieved in the disclosure are not limited to those mentioned above, and other technical objectives not mentioned will be clearly understood by those skilled in the art from the following description.

An electronic device according to certain embodiments of the disclosure may include: a housing forming at least part of an exterior of the electronic device, a nozzle part protruding in one direction from a portion of the housing, at least one sound hole formed at one end of the nozzle part, a sound tube formed within the nozzle part, a microphone module disposed within the sound tube, and including a microphone hole formed on one side thereof, and a speaker module disposed under the microphone module, wherein at least some of the microphone inclines in a specific direction within the sound tube, and is coupled to an interior of the nozzle part.

A microphone module according to certain embodiments of the disclosure may include: a microphone that converts a voice input through the microphone hole into an electrical signal, a printed circuit board (PCB) disposed under the microphone, a first plate disposed under the PCB, supporting the PCB, According to certain embodiments of the disclosure, the microphone module includes a waterproof member and is disposed adjacent to the user's eardrum, so that active noise canceling performance may be implemented.

According to certain embodiments of the disclosure, the microphone module is tilted at a specific angle in the sound tube and coupled to the inside of the housing, which reduces the introduction of foreign substances such as moisture from the external environment through the microphone hole of the microphone module.

In addition, various effects identified directly or indirectly through this document may be provided.

BRIEF DESCRIPTION OF THE DRAWINGS

In connection with the description of the drawings, the same or similar reference symbols may be used for the same or similar elements.

DETAILED DESCRIPTION

Certain embodiments of this document and terms used therein are not intended to limit the technical features described in this document to specific embodiments, but should be understood to include various modifications, equivalents, or substitutes of the corresponding embodiments.

In connection with the description of the drawings disclosed in this document, similar reference symbols may be used for similar or related elements. The singular form of a noun corresponding to a specific item may include one or multiple pieces of the item unless the relevant context clearly indicates otherwise.

In this document, each of phrases such as "A or B", "at least one of A and B", "at least one of A or B", "A, B or C", "at least one of A, B and C", and "at least one of A, B or C" may include any one of or all possible combinations of the items enumerated together in the corresponding one of the phrases. Terms such as "1st" and "2nd", or "first" and "second" may be used to simply distinguish a corresponding component from another, and does not limit the components in other aspect (e.g., importance or order). When an element (e.g., first element) is referred to, with or without the term "operably" or "communicatively", as "coupled to/with" or "connected to/with" another element (e.g., second element), this means that the element may be connected or coupled to the other element directly (e.g., wiredly), wirelessly, or via a third element.

The term "module" used in certain embodiments of this document may be an integrally constituted component or a minimum unit or part thereof that performs one or more functions.

Figure 1:
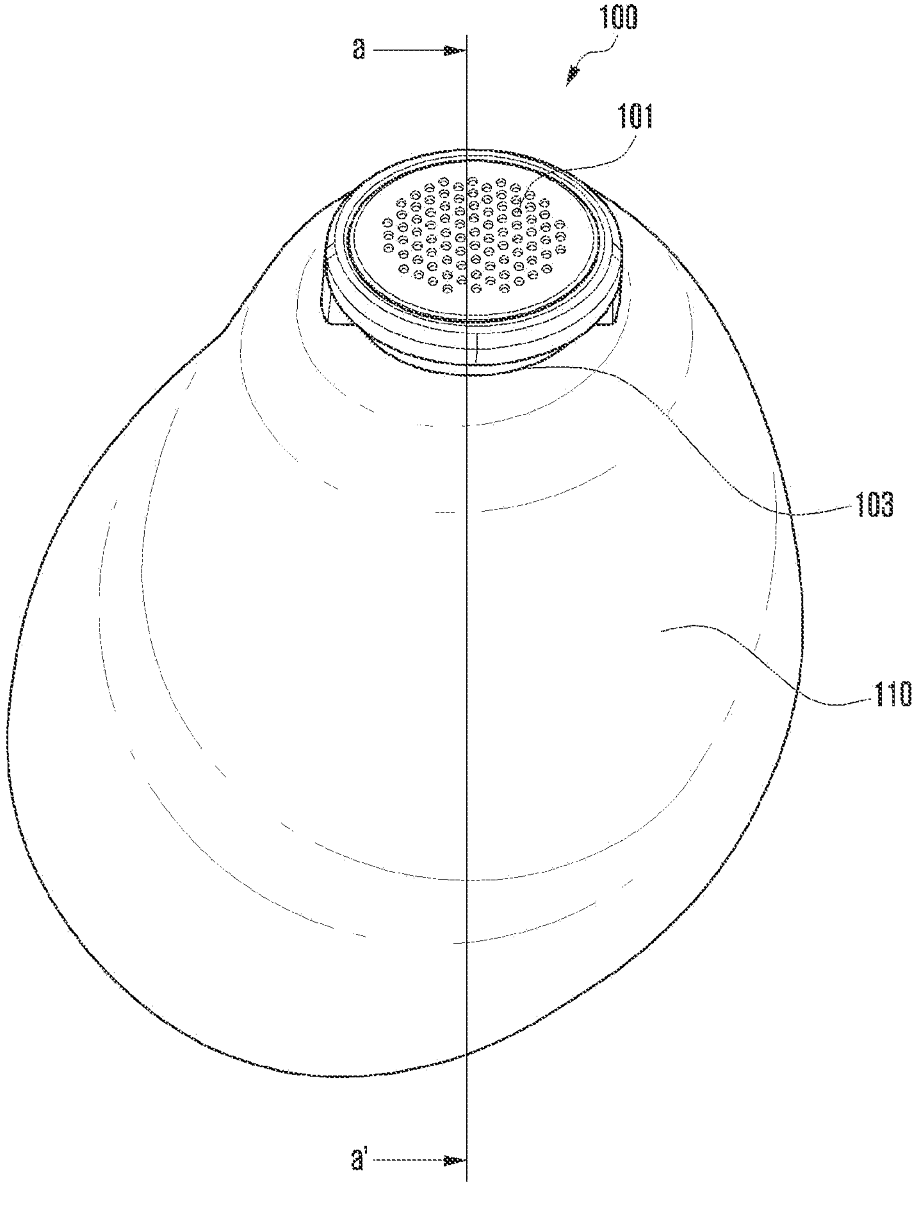
FIG. 1 is a perspective view illustrating an external appearance of an electronic device according to certain embodiments of the disclosure.
Figure 2:
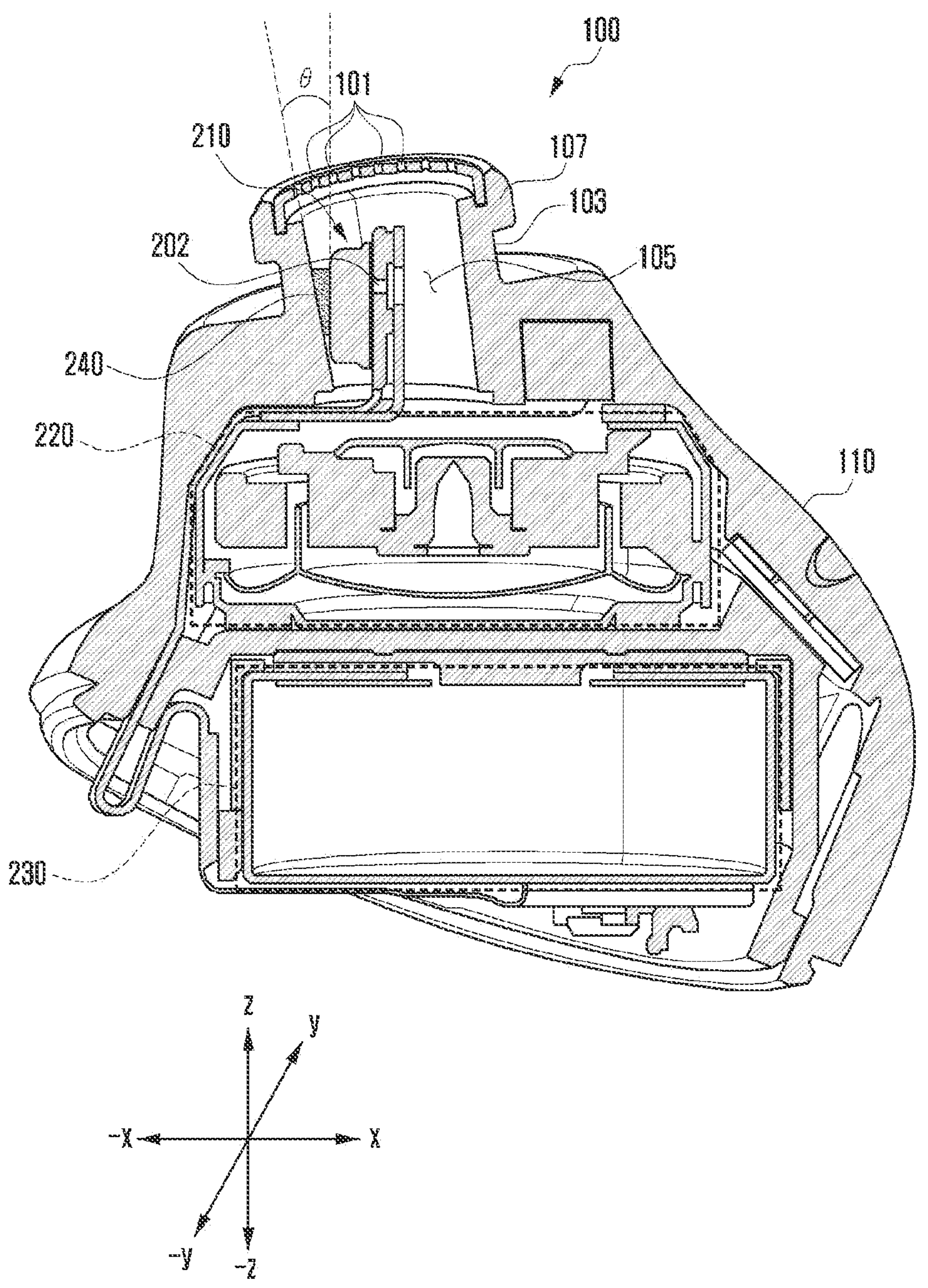
FIG. 2 is a schematic cross-sectional view of the electronic device along line a-a' in FIG. 1 according to certain embodiments of the disclosure.

FIG. 1 is a perspective view showing an external appearance of an electronic device according to certain embodiments of the disclosure. FIG. 2 is a schematic cross-sectional view of the electronic device along line a-a' in FIG. 1 according to certain embodiments of the disclosure.

The electronic device 100 disclosed in FIGS. 1 and 2 may include an in-ear wearable electronic device that can be worn on a user's ear. The in-ear wearable electronic device may include, for example, at least one of an earphone, earbud, in-ear earset, in-ear headset, or hearing aid. In-ear wearable electronic devices are not limited to those mentioned, and may include various electronic devices including a microphone module and/or a speaker module.

With reference to FIGS. 1 and 2, the electronic device 100 according to certain embodiments of the disclosure may include a housing 110, sound holes 101, a nozzle part 103, a sound tube 105, a microphone module 210, a speaker module 220, and/or a battery 230.

According to an embodiment, the housing 110 may form the external appearance of the electronic device 100. At least a portion of the housing 110 may be inserted into an ear of the user of the electronic device 100. At least a portion of the housing 110 may include a shape couplable to and detachable from the ear (e.g., external auditory meatus) of the user of the electronic device 100.

According to certain embodiments, at least some of the housing 110 may be formed of various materials such as polymers and/or metals. The housing 110 may include the sound holes 101, nozzle part 103, sound tube 105, microphone module 210, speaker module 220, and/or battery 230.

According to an embodiment, the sound hole 101 may be formed at one end (e.g., nozzle part 103) of the housing 110. The sound hole 101 may include at least one opening. The sound hole 101 may be formed at one end of the nozzle part 103. Some of the sound holes 101 may transmit a sound output through the speaker module 220 toward the eardrum of the user of the electronic device 100. Some of the sound holes 101 may receive the user's voice direct them towards the microphone hole 202 of the microphone module 210.

According to certain embodiments, the sound holes 101 may be formed using a mesh member in which a plurality of holes are formed. When the sound holes 101 are formed using a mesh member, the mesh member may be coupled to one end surface of the nozzle part 103. The sound holes 101 may include a passage connecting the sound tube 105 and the external environment of the electronic device 100 (e.g., housing).

According to an embodiment, the nozzle part 103 may be integrally formed with the housing 110. The nozzle part 103 may formed so as to protrude from a part of the housing 110 in one direction (e.g., z-axis direction). At least a portion of the nozzle part 103 may be inserted into and worn in the user's ear (e.g., external auditory meatus) of the electronic device 100. The nozzle part 103 may include a sound tube 105 as a sound transmission passage therein.

According to certain embodiments, the nozzle part 103 may include a pipe shape to form the sound tube 105 therein. The nozzle part 103 may include a cylindrical shape. An end of the nozzle part 103 may include at least one sound hole 101. According to certain embodiments, the nozzle part 103 may include a protrusion portion 107 formed along the circumference of one end. An ear tip (not shown) may be coupled to the protrusion portion 107 of the nozzle part 103. The ear tip may be coupled to the outer circumferential surface of one end of the nozzle part 103 through the protrusion portion 107. At least a portion of the ear tip may be inserted into the ear (e.g., external auditory meatus) of the user of the electronic device 100 and may come into contact with the inner surface of the external auditory meatus. The ear tip may be made of a material having some elasticity (e.g., rubber or silicone), and may be detachably coupled to the nozzle part 103 through the protrusion portion 107. At least a portion of the ear tip may be inserted into the ear (e.g., external auditory meatus) of the user of the electronic device 100 and deformed to fit the shape of the external auditory meatus.

According to an embodiment, the sound tube 105 may be formed inside the nozzle part 103. The sound tube 105 may include a transmission passage for travel of a voice and/or sound. The sound tube 105 may transfer a sound output through the speaker module 220 to the sound holes 101. The sound tube 105 may receive a user's voice input through the sound holes 101 and transfer it to the microphone hole 202 of the microphone module 210.

According to certain embodiments, the sound tube 105 may be formed in a shape corresponding to the nozzle part 103. For example, the sound tube 105 may have a cylindrical shape. The sound tube 105 may be configured to communicate with the sound holes 101. The sound tube 105 may be connected to the sound holes 101.

According to an embodiment, the microphone module 210 may be disposed inside the housing 110. The microphone module 210 may be disposed within the sound tube 105. The microphone module 210 may be disposed below the sound holes 101 (e.g., in negative z-axis direction). The microphone module 210 may be disposed between the sound hole 101 and the speaker module 220.

According to certain embodiments, the microphone module 210 may include a microphone hole 202. The microphone hole 202 may be formed in one direction (e.g., x-axis direction) of the microphone module 210. The microphone module 210 may receive, through the microphone hole 202, a voice (e.g., audio) of the user of the electronic device 100 input through the sound holes 101 and the sound tube 105 and convert it into an electrical signal. For example, the microphone module 210 may convert a user's voice input through the microphone hole 202 into a digital signal. According to an embodiment, the microphone module 210 may be disposed to be inclined in a specific direction with respect to the direction of the sound tube 105. The microphone hole 202 may be disposed to have an obtuse angle with the sound tube 105.

According to certain embodiments, the microphone module 210 may include, as an audio input interface, one of a dynamic microphone, a condenser microphone, and a micro-electro-mechanical system (MEMS) or piezo microphone. The microphone module 210 may include a microphone for active noise canceling to remove noise inside the electronic device 100.

According to an embodiment, the speaker module 220 may be disposed under the microphone module 210 (e.g., in negative z-axis direction). The speaker module 220 may be disposed under the sound tube 105 (e.g., in negative z-axis direction). The speaker module 220 may be disposed between the microphone module 210 and the battery 230. The speaker module 220 may convert an electrical signal into a sound and transmit the converted sound to the eardrum of the user of the electronic device 100 through the sound tube 105 and the sound holes 101. The speaker module 220 may be disposed to be inclined in a specific direction with the direction of the sound tube 105.

According to certain embodiments, the speaker module 220 may be configured to allow the user of the electronic device 100 to listen to various sound-related information such as playable music or playable multimedia. The speaker module 220 may be electrically connected to the microphone module 210 by using a connection member (e.g., connection member 322 in FIG. 4 or FPCB). According to an embodiment, the speaker module 220 may include a main printed circuit board (not shown). The main printed circuit board of the speaker module 220 may be electrically connected to a printed circuit board (e.g., printed circuit board 320 in FIG. 4) of the microphone module 210 by using, for example, the connection member 322 (e.g., FPCB) in FIG. 4. At least some of the printed circuit board of the microphone module 210 may be disposed along the sidewall of the speaker module 220 and electrically connected to the main printed circuit board of the speaker module 220.

According to an embodiment, the battery 230 may be disposed under the speaker module 220 (e.g., in negative z-axis direction). The battery 230 may supply power to at least one component (e.g., microphone module 210 and/or speaker module 220) of the electronic device 100. The battery 230 may include, for example, a rechargeable secondary cell.

Figure 3:
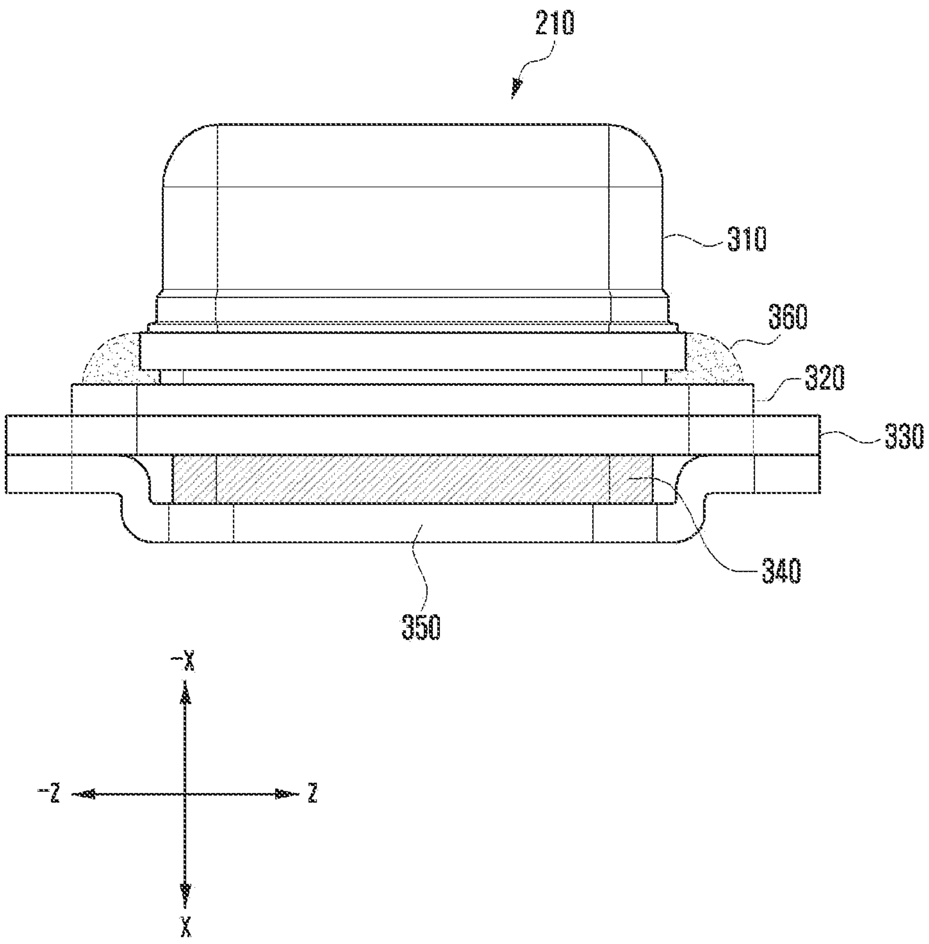
FIG. 3 is a view of a microphone module of the electronic device viewed in the negative x-axis direction of FIG. 2 according to certain embodiments of the disclosure.
Figure 4:
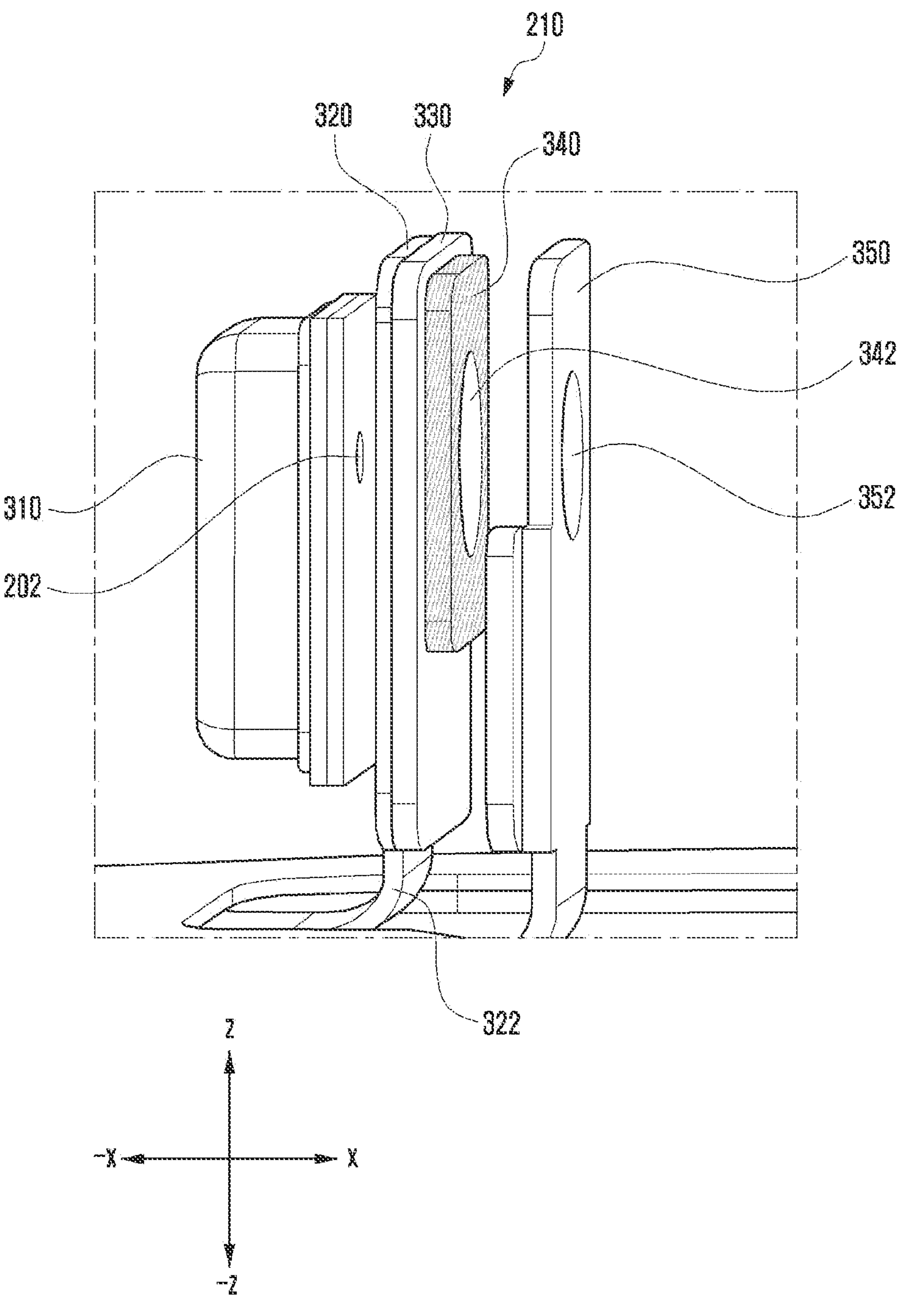
FIG. 4 is a schematic exploded perspective view of the microphone module of the electronic device viewed in the z-axis direction of FIG. 2 according to certain embodiments of the disclosure.
Figure 5:
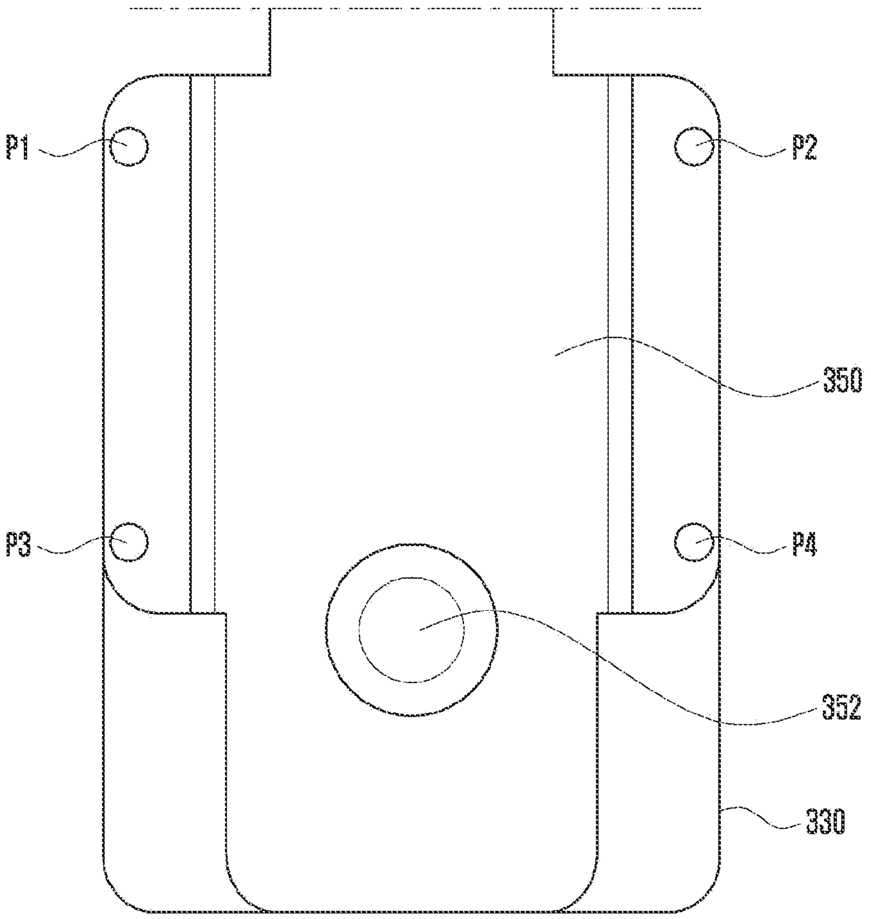
FIG. 5 is a rear view illustrating coupling between a first plate and a second plate of the electronic device according to certain embodiments of the disclosure.

FIG. 3 is a view of the microphone module of the electronic device viewed in the negative x-axis direction of FIG. 2 according to certain embodiments of the disclosure. FIG. 4 is a schematic exploded perspective view of the microphone module of the electronic device viewed in the z-axis direction of FIG. 2 according to certain embodiments of the disclosure. FIG. 5 is a rear view illustrating coupling between a first plate and a second plate of the electronic device according to certain embodiments of the disclosure.

With reference to FIGS. 3 to 5, the microphone module 210 according to certain embodiments of the disclosure may include a microphone 310, a printed circuit board 320, a first plate 330, a waterproof member 340, and/or a second plate 350.

According to an embodiment, the microphone 310 may convert a voice (e.g., analog signal) of the user of the electronic device 100 input through the microphone hole 202 into an electrical signal (e.g., digital signal). The microphone 310 may be mounted on the printed circuit board 320 using surface mount technology.

According to an embodiment, the printed circuit board 320 may be disposed under the microphone 310 (e.g., in x-axis direction). The printed circuit board 320 may be electrically connected to the microphone 310. The printed circuit board 320 may include at least one circuit related to signal processing of the microphone 310 (e.g., analog-to-digital converter, digital-to-analog converter). The printed circuit board 320 may also include at least one hole (not shown) at a position corresponding to the microphone hole 202. The printed circuit board 320 may include a flexible printed circuit board (FPCB). The printed circuit board 320 may be electrically connected to the speaker module 220 using a connection member 322. For example, at least some of the printed circuit board 320 may be disposed along the sidewall of the speaker module 220, and may be electrically connected to the main printed circuit board (not shown) of the speaker module 220 using the connection member 322 (e.g., FPCB). In an embodiment, the connection member 322 may be integrally formed with the printed circuit board 320. The connection member 322 may include a connector. The connection member 322 may be fastened to the main printed circuit board (not shown) by using the connector.

According to an embodiment, the first plate 330 may be disposed under the printed circuit board 320 (e.g., in x-axis direction). The first plate 330 may fix or support the printed circuit board 320. The first plate 330 may include at least one hole (not shown) disposed at a position corresponding to the microphone hole 202. The first plate 330 may include reinforced stainless steel (SUS).

According to an embodiment, the waterproof member 340 may be disposed under the first plate 330 (e.g., in x-axis direction). The waterproof member 340 may waterproof the microphone module 210. The waterproof member 340 may include a first hole 342 disposed at a position corresponding to the microphone hole 202. The waterproof member 340 may be disposed between the first plate 330 and the second plate 350. The waterproof member 340 may be fixed between the first plate 330 and the second plate 350.

According to an embodiment, the second plate 350 may be disposed under the waterproof member 340 (e.g., in x-axis direction). The second plate 350 may support the waterproof member 340. The second plate 350 may support the microphone module 210. The second plate 350 may support the microphone module 210 so that it is stably disposed within the sound tube 105. The second plate 350 may include a second hole 352 disposed at a position corresponding to the microphone hole 202 and the first hole 342 of the first plate 330. The second plate 350 may be atop or back plate of the microphone module 210. The second plate 350 may include reinforced stainless steel (SUS). According to an embodiment, at least a portion (e.g., region) of the second plate 350 may be formed via bending. At least a portion (e.g., region) of the second plate 350 may be coupled to a portion of the speaker module 220 and/or at least a portion of the inner surface of the housing 110.

According to certain embodiments, the first plate 330 may be omitted. For example, the waterproof member 340 may be disposed under the printed circuit board 320, and the second plate 350 may be disposed under the printed circuit board 320 and/or the waterproof member 340. The second plate 350 may support the microphone module 210. The second plate 350 may protect the waterproof member 340 and support the printed circuit board 320.

According to certain embodiments, at least a portion of the microphone module 210 may be at least partially coupled to the inside of the nozzle part 103 by using an adhesive member 240 in the sound tube 105. For example, in FIG. 2, the angle between the vertical axis of one side of the sound tube 105 and the vertical axis of the microphone module 210 (e.g., outer surface of the microphone 310) may form an acute angle θ (e.g., 5° to 45°).

According to certain embodiments, a sealing member 360 may be filled between the microphone 310 and the printed circuit board 320. The sealing member 360 may prevent foreign substances such as moisture from penetrating between the microphone 310 and the printed circuit board 320. The sealing member 360 may include an adhesive.

With reference to FIGS. 3 and 5, at least some of the lower surface (e.g., x-axis direction) of the first plate 330 and at least some of the upper surface (e.g., zy-axis plane) of the second plate 350 may be joined by using at least one point (e.g., P1 to P4). For example, at least some of the lower surface (e.g., x-axis direction) of the first plate 330 and at least some of the upper surface (e.g., zy-axis plane) of the second plate 350 may be joined by welding at least one point (e.g., P1 to P4). The first plate 330 and the second plate 350 may stably fix and support the waterproof member 340 disposed therein.

Figure 6:
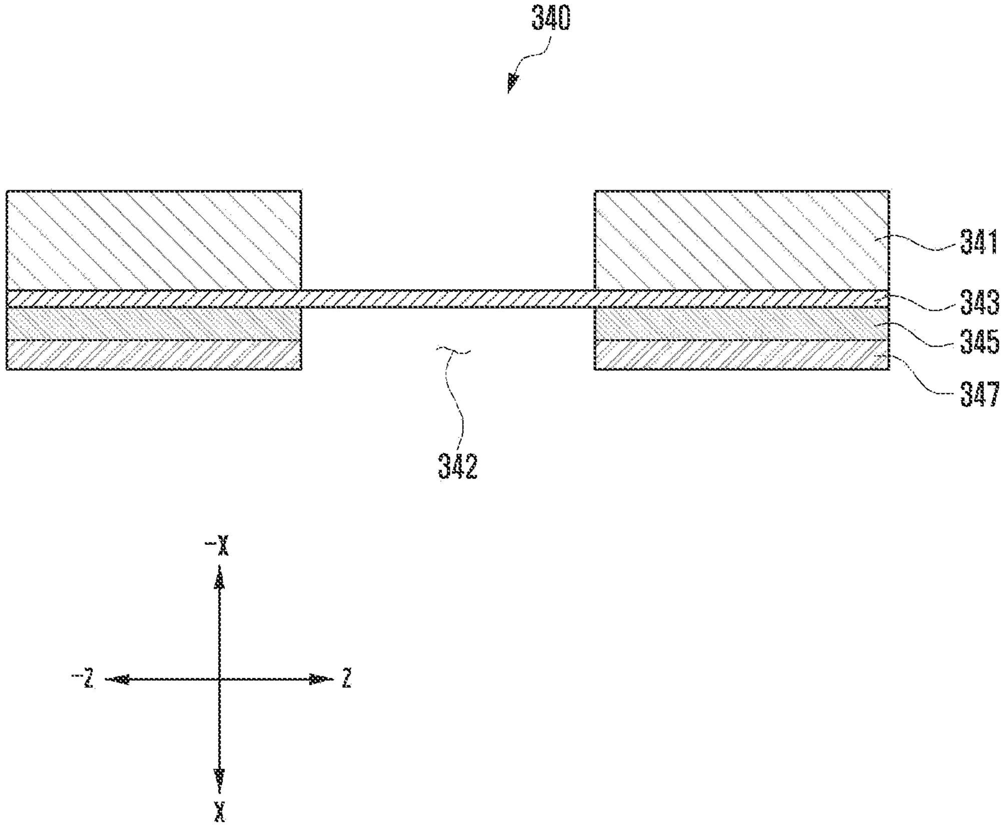
FIG. 6 is a cross-sectional view illustrating a configuration of a waterproof member of the electronic device according to certain embodiments of the disclosure.

FIG. 6 is a cross-sectional view illustrating a configuration of the waterproof member of the electronic device according to certain embodiments of the disclosure.

With reference to FIG. 6, the waterproof member 340 according to certain embodiments of the disclosure may include a waterproof tape 341, a waterproof membrane 343, a double-sided tape 345, and/or a protection member 347.

According to an embodiment, the waterproof tape 341 may be adhered to the first plate 330. The waterproof tape 341 may be disposed under the first plate 330 (e.g., in x-axis direction). The waterproof tape 341 may be disposed around the first hole 342 formed in the waterproof member 340.

According to an embodiment, the waterproof membrane 343 may be adhered to a lower portion (e.g., in x-axis direction) of the waterproof tape 341. The waterproof membrane 343 may be disposed across the first hole 342 formed in the waterproof member 340. The waterproof membrane 343 may include a membrane.

According to an embodiment, the double-sided tape 345 may be adhered to a lower portion (e.g., in x-axis direction) of the waterproof membrane 343. The double-sided tape 345 may be disposed around the first hole 342 formed in the waterproof member 340. The double-sided tape 345 may adhere the waterproof membrane 343 and the protection member 347 together.

According to an embodiment, the protection member 347 may be disposed under the double-sided tape 345 (e.g., in x-axis direction). The protection member 347 may be adhered to the second plate 330. The protection member 347 may be disposed around the first hole 342 formed in the waterproof member 340. The protection member 347 may include an adhesive component. The protection member 347 may include at least one of polyethylene terephthalate (PET), rubber, silicone, polymer material, or sponge.

Figure 7:
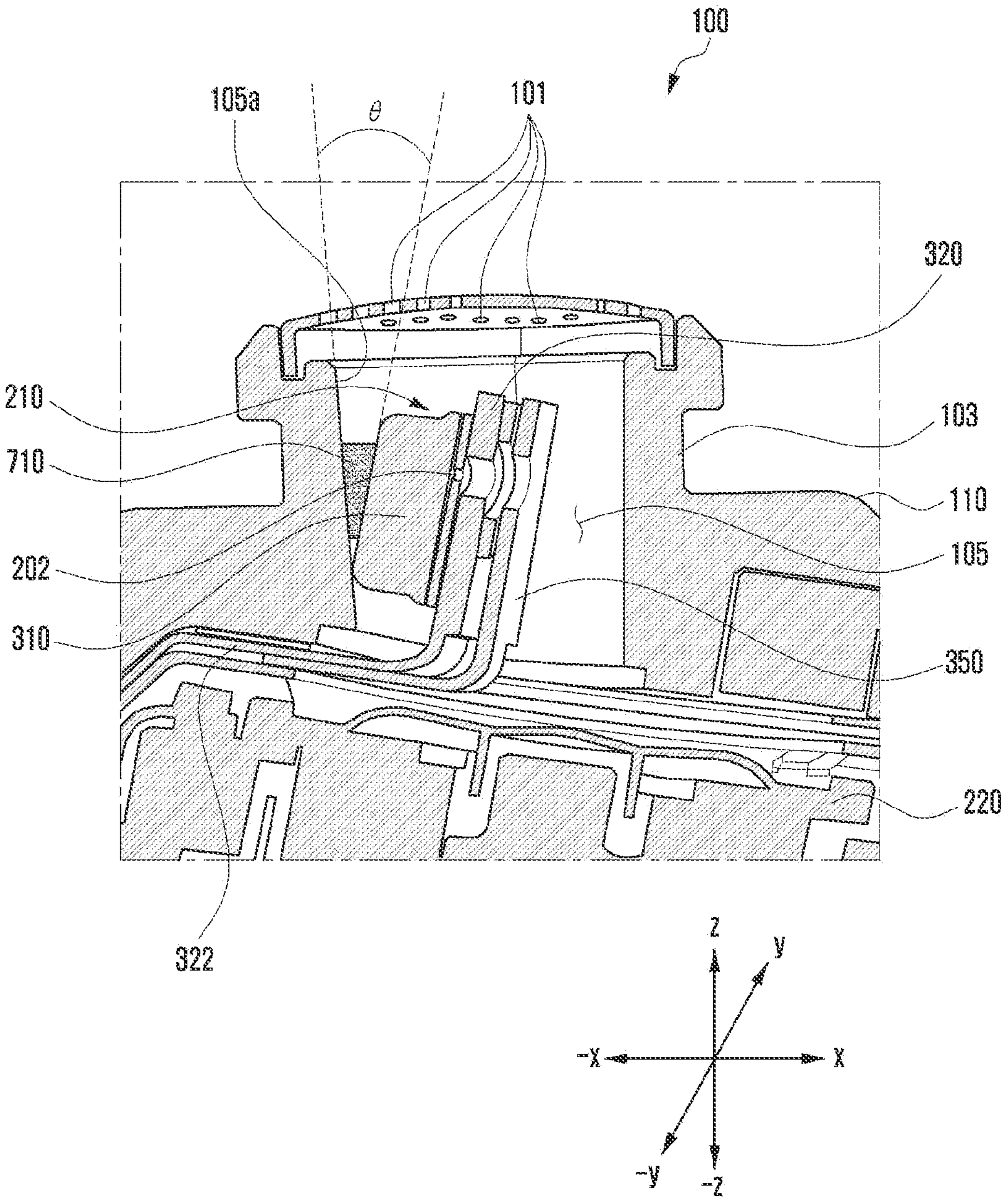
FIG. 7 is a schematic cross-sectional view illustrating a state in which one end surface of the microphone module of the electronic device is coupled to the inside of the housing according to certain embodiments of the disclosure.
Figure 8:
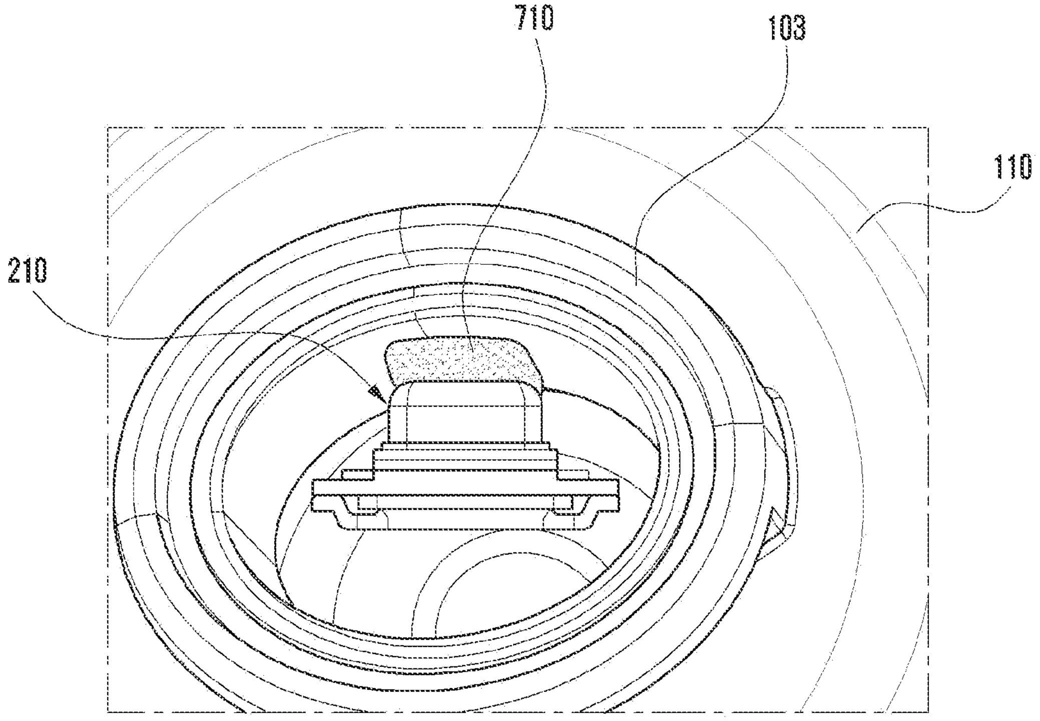
FIG. 8 is a schematic perspective view illustrating a state in which one end surface of the microphone module of the electronic device is coupled to the inside of the housing according to certain embodiments of the disclosure.

FIG. 7 is a schematic cross-sectional view illustrating a state in which one end surface of the microphone module of the electronic device is coupled to the inside of the housing according to certain embodiments of the disclosure. FIG. 8 is a schematic perspective view illustrating a state in which one end surface of the microphone module of the electronic device is coupled to the inside of the housing according to certain embodiments of the disclosure.

With reference to FIGS. 7 and 8, at least some (e.g., one end surface) of the microphone module 210 of the electronic device 100 according to certain embodiments of the disclosure may be disposed to be inclined in a specific direction (e.g., x-axis direction) in the sound tube 105. At least a portion (e.g., one end surface or side surface) of the microphone 310 of the microphone module 210 may be coupled to one side surface **105*a* in the sound tube 105 by using an adhesive member 710. For example, at least a portion of the microphone 310 of the microphone module 210 may be at least partially coupled to one side surface 105*a* in the sound tube 105 by using the adhesive member 710**.

According to an embodiment, the vertical axis (e.g., side surface) of the microphone 310 of the microphone module 210 and the one side surface **105*a* (e.g., vertical axis) in the sound tube 105 may be arranged to have an acute angle θ (e.g., 5° to 45°). As the microphone module 210 is inclined in a specific direction (e.g., x-axis direction) in the sound tube 105, the speaker module 220** may also be inclined in a specific direction (e.g., y-axis direction).

According to an embodiment, at least some region of the second plate 350 of the microphone module 210 may be formed by bending in a designated direction (e.g., negative x-axis direction). The at least some region (e.g., bent region) of the second plate 350 may be fixedly coupled to a portion of the speaker module 220 and/or at least a portion of the inner surface of the housing 110. According to an embodiment, when the microphone module 210 is inclined in a specific direction (e.g., y-axis direction) in the sound tube 105 and is coupled to the inside of the nozzle part 103 (e.g., one side surface **105*a* in the sound tube 105) by using the adhesive member 710, the microphone hole 202 formed in one direction (e.g., x-axis direction) of the microphone 310 may be disposed at an obtuse angle with the sound tube 105** formed, for example, in the z-axis direction.

According to an embodiment, when the microphone module 210 is inclined in a specific direction (e.g., x-axis direction) in the sound tube 105, and the microphone hole 202 of the microphone 310 is disposed at an obtuse angle with the sound tube 105, this can reduce the introduction of foreign substances such as moisture into the microphone hole 202, through the sound holes 101 in comparison to the case where the microphone hole 202 is disposed vertically with the sound tube 105.

According to certain embodiments, in the electronic device 100 according to certain embodiments of the disclosure, as the microphone module 210 includes a waterproof member, the microphone module 210 can be placed close to the eardrum of the user of the electronic device 100.

According to certain embodiments, in the electronic device 100 according to certain embodiments of the disclosure, one end portion of the microphone module 210 (e.g., microphone 310) is inclined at a certain angle (e.g., acute angle) in the sound tube 105 and is coupled to the inside of the housing 110 (e.g., inside of the nozzle part 103 and/or one side surface **105*a* in the sound tube 105), which can improve prevention of inflow of foreign substances such as moisture through the microphone hole 202 of the microphone module 210** from the external environment.

An electronic device 100 according to certain embodiments of the disclosure may include: a housing 110 include the external appearance of the electronic device 100; a nozzle part 103 formed to protrude in one direction from a portion of the housing 110; at least one sound hole 101 formed at one end of the nozzle part 103; a sound tube 105 formed inside the nozzle part 103; a microphone module 210 disposed inside the sound tube 105 and including a microphone hole 202 formed on one side; and a speaker module 220 disposed under the microphone module 210, wherein at least some of the microphone module 210 may be formed to be inclined in a specific direction in the sound tube 105 and coupled to the inside of the nozzle part 103.

According to an embodiment, the nozzle part 103 may include a protrusion portion 107 formed along the circumference of one end, and an ear tip (not shown) detachably coupled to the protrusion portion 107.

According to an embodiment, the microphone hole 202 may be disposed at an obtuse angle with the sound tube 105.

According to an embodiment, the electronic device 100 may further include a battery 230 that is disposed under the speaker module 220 and supplies power to the microphone module 210 and/or the speaker module 220.

According to an embodiment, at least some of the printed circuit board 320 electrically connected to the microphone 310 of the microphone module 210 may be disposed along a sidewall of the speaker module 220, and may be electrically connected to a main printed circuit board of the speaker module 220 by using a connection member 322.

According to an embodiment, the microphone module 210 may include: a microphone 310 that converts a voice input through the microphone hole 202 into an electrical signal; a printed circuit board 320 disposed under the microphone 310; a first plate 330 disposed under the printed circuit board 320 and supporting the printed circuit board 320; a waterproof member 340 disposed under the first plate 330; and a second plate 350 that is disposed under the waterproof member 340, is at least partially coupled to the first plate 330, and is formed to support the waterproof member 340.

According to an embodiment, the printed circuit board 320 may include at least one hole (not shown) formed at a position corresponding to the microphone hole 202; the first plate 330 may include at least one hole (not shown) formed at a position corresponding to the microphone hole 202; the waterproof member 340 may include a first hole 342 formed at a position corresponding to the microphone hole 202; and the second plate 350 may include a second hole 352 formed at a position corresponding to the microphone hole 202.

According to an embodiment, when at least a portion of the microphone module 210 is inclined in a specific direction in the sound tube 105, at least a portion of the microphone 310 may be coupled to the interior of the nozzle part 103 by using an adhesive member 710.

According to an embodiment, the microphone module 210 may be formed such that a sealing member 360 fills a space formed between the microphone 310 and the printed circuit board 320.

According to an embodiment, at least a portion of a lower surface of the first plate 330 and at least a portion of an upper surface of the second plate 350 may be coupled.

According to an embodiment, the waterproof member 340 may include a waterproof tape 341 disposed around the first hole 342 and adhered to the first plate 330, a waterproof membrane 343 disposed across the first hole 342 and adhered to a lower portion of the waterproof tape 341, a double-sided tape 345 disposed around the first hole 342 and adhered to a lower portion of the waterproof membrane 343, and a protection member 347 disposed around the first hole 342 and adhered to a lower portion of the double-sided tape 345, wherein the protection member 347 may be adhered to the second plate 350.

According to an embodiment, at least some of the second plate 350 may be disposed to be inclined so that one end thereof forms an acute angle with respect to the inside of the nozzle part 103.

According to an embodiment, the speaker module 220 may be disposed to be inclined in a specific direction with the direction of the sound tube 105.

According to an embodiment, the microphone module 210 may be disposed between the sound hole 101 and the speaker module 220.

According to an embodiment, the second plate 350 may be formed to be bent in some region, and the some region of the second plate 350 may be coupled to the speaker module 220 and/or a portion of the inner surface the housing 110.

Hereinabove, the disclosure has been described according to certain embodiments of the disclosure, but it will be evident that changes and modifications made by those skilled in the art may not depart from the technical range of the disclosure, and thus also belong to the disclosure.

What is claimed is:

1. An electronic device, comprising:

a housing forming at least part of an exterior of the electronic device;

a nozzle part protruding in one direction from a portion of the housing;

at least one sound hole formed at one end of the nozzle part;

a sound tube formed in at least a portion of the nozzle part;

a microphone module disposed within the sound tube, and including a microphone hole formed on one side of the microphone module; and a speaker module disposed under the microphone module, wherein at least a portion of the microphone module inclines in a specific direction within the sound tube, and is coupled to an interior of the nozzle part, wherein the microphone module includes:

a microphone that converts a voice input received through the microphone hole into an electrical signal;

a first plate;

a second plate substantially parallel to the first plate;

a printed circuit board (PCB) disposed between the first plate and the microphone;

a waterproof member disposed between the first plate and the second plate and coupled with the first plate and the second plate;

wherein the second plate is at least partially coupled to the first plate.

2. The electronic device of claim 1, wherein the nozzle part includes a protrusion portion formed along a circumference of one end thereof, and an ear tip detachably coupled to the protrusion portion.

3. The electronic device of claim 1, wherein the microphone hole is disposed at an obtuse angle with respect to the sound tube.

4. The electronic device of claim 1, further comprising a battery disposed under the speaker module wherein the battery supplies power to the microphone module and/or the speaker module.

5. The electronic device of claim 1, wherein at least a portion of the PCB electrically connected to the microphone is disposed along a sidewall of the speaker module, and is electrically connected to a main printed circuit board (PCB) of the speaker module through a connecting member.

6. The electronic device of claim 1, wherein at least a portion of the microphone is coupled to the interior of the nozzle part using an adhesive member.

7. The electronic device of claim 1, wherein a sealing member fills a space formed between the microphone and the PCB.

8. The electronic device of claim 1, wherein at least a portion of a lower surface of the first plate and at least a portion of an upper surface of the second plate are coupled together.

9. The electronic device of claim 1, wherein the speaker module is inclined towards a direction of the sound tube.

10. The electronic device of claim 1, wherein the microphone module is disposed between the sound hole and the speaker module.

11. A microphone module, comprising:

a microphone that converts a voice input received through a microphone hole into an electrical signal;

a first plate;

a second plate substantially parallel to the first plate;

a printed circuit board (PCB) disposed between the first plate and the microphone; and a waterproof member disposed between the first plate and the second plate and coupled with the first plate and the second plate, wherein the second plate is at least partially coupled to the first plate, and wherein the first plate includes at least one hole formed at a position corresponding to the microphone hole;

the second plate includes at least one hole formed at a position corresponding to the microphone hole;

the PCB includes at least one hole formed at a position corresponding to the microphone hole; and the waterproof member includes at least one hole formed at a position corresponding to the microphone hole.

12. The microphone module of claim 11, wherein a sealing member fills a space formed between the microphone and the printed circuit board.

13. The microphone module of claim 11, wherein at least a portion of a lower surface of the first plate and at least a portion of an upper surface of the second plate are coupled together.

* * * * *